(12) United States Patent
Speer

(10) Patent No.: US 7,469,863 B1
(45) Date of Patent: Dec. 30, 2008

(54) SYSTEMS AND METHODS FOR AUTOMATICALLY AND SEMIAUTOMATICALLY CONTROLLING AIRCRAFT REFUELING

(75) Inventor: Thomas E. Speer, Seattle, WA (US)

(73) Assignee: The Boeing Company, Chicago, IL (US)

( * ) Notice: Subject to any disclaimer, the term of this patent is extended or adjusted under 35 U.S.C. 154(b) by 604 days.

(21) Appl. No.: 11/090,347

(22) Filed: Mar. 24, 2005

(51) Int. Cl.
B64D 39/00 (2006.01)

(52) U.S. Cl. .................................. 244/135 A
(58) Field of Classification Search ............. 244/135 A
See application file for complete search history.

(56) References Cited

U.S. PATENT DOCUMENTS

| | | |
|---|---|---|
| 724,675 A | 4/1903 | Decker |
| 2,091,916 A | 8/1937 | Evans |
| 2,213,680 A | 9/1940 | Share |
| 2,414,509 A | 1/1947 | Andre |
| 2,453,553 A | 11/1948 | Tansley |
| 2,475,635 A | 7/1949 | Parsons |
| 2,552,991 A | 5/1951 | McWhorter |
| 2,668,066 A | 2/1954 | Stadelhofer |
| 2,670,913 A | 3/1954 | Castor et al. |
| 2,712,831 A | 7/1955 | Day |
| 2,859,002 A | 11/1958 | Leisy |
| 2,875,787 A | 3/1959 | Evans |
| 2,879,017 A | 3/1959 | Smith |
| 2,919,937 A | 1/1960 | Dovey |
| 2,953,332 A | 9/1960 | Cobham et al. |
| 2,954,190 A | 9/1960 | Le Clair |
| 2,960,295 A | 11/1960 | Schulz |

(Continued)

FOREIGN PATENT DOCUMENTS

DE 2744674 4/1979

(Continued)

OTHER PUBLICATIONS http://www.aviationtoday.com/print/av/categories/military/669.html, Smart Tanker.*

(Continued)

Primary Examiner—Timothy D Collins
(74) Attorney, Agent, or Firm—Perkins Coie LLP

(57) ABSTRACT

Aerial refueling systems and associated methods are disclosed. A system in accordance with one embodiment of the invention includes an operator input device configured to receive operator inputs and direct a first input signal corresponding to a target position for an aerial refueling device. A sensor can be positioned to detect a location of at least one of the aerial refueling device and a receiver aircraft, and can be configured to direct a second input signal. A controller can be operatively coupled to the operator input device and the sensor to receive the first and second input signals and direct a command signal to adjust the position of the aerial refueling device in response to both the first and second input signals, unless either or both of the input signals are absent or below a threshold value. Accordingly, the system can respond to both automatically generated sensor data and data input by an operator. A fully automated version of the system can be installed on an unmanned aircraft having additional capabilities, for example, electronic surveillance and/or jamming capabilities.

18 Claims, 5 Drawing Sheets

U.S. PATENT DOCUMENTS

| | | | |
|---|---|---|---|
| 2,967,684 A | 1/1961 | Knecht | |
| 2,973,171 A | 2/1961 | Ward et al. | |
| 3,063,470 A | 11/1962 | Forster | |
| 3,091,419 A | 5/1963 | Mosher | |
| 3,103,234 A | 9/1963 | Washburn | |
| 3,206,232 A | 9/1965 | Gleason | |
| 3,680,311 A | 8/1972 | Harbonn et al. | |
| 3,747,873 A | 7/1973 | Layer et al. | |
| 3,836,117 A | 9/1974 | Panicali | |
| 3,917,196 A | 11/1975 | Pond et al. | |
| 3,928,903 A | 12/1975 | Richardson et al | |
| 4,044,834 A | 8/1977 | Perkins | |
| 4,072,283 A | 2/1978 | Weiland | |
| 4,088,154 A | 5/1978 | Patton et al. | |
| 4,095,761 A | 6/1978 | Anderson et al. | |
| 4,119,294 A | 10/1978 | Schnorrenberg et al. | |
| 4,129,270 A | 12/1978 | Robinson et al. | |
| 4,149,739 A | 4/1979 | Morris | |
| 4,150,803 A | 4/1979 | Fernandez | |
| 4,231,536 A | 11/1980 | Ishimitsu et al. | |
| 4,236,686 A | 12/1980 | Barthelme et al. | |
| 4,327,784 A | 5/1982 | Denniston | |
| 4,408,943 A | 10/1983 | McTamaney et al. | |
| 4,438,793 A | 3/1984 | Brown | |
| 4,471,809 A | 9/1984 | Thomsen et al. | |
| 4,477,040 A | 10/1984 | Karanik | |
| 4,534,384 A | 8/1985 | Graham et al. | |
| 4,540,144 A | 9/1985 | Perrella | |
| 4,586,683 A | 5/1986 | Kerker | |
| 4,612,089 A | 9/1986 | Hauptmann | |
| 4,665,936 A | 5/1987 | Furrer et al. | |
| H297 H | 7/1987 | Schultz | |
| 4,717,099 A | 1/1988 | Hubbard | |
| 4,796,838 A | 1/1989 | Yamamoto | |
| 4,883,102 A | 11/1989 | Gabrielyan et al. | |
| 4,929,000 A | 5/1990 | Annestedt, Sr. | |
| 5,131,438 A | 7/1992 | Loucks | |
| 5,141,178 A | 8/1992 | Alden et al. | |
| 5,255,877 A | 10/1993 | Lindgren et al. | |
| 5,393,015 A | 2/1995 | Piasecki | |
| 5,427,333 A | 6/1995 | Kirkland | |
| 5,449,203 A | 9/1995 | Sharp | |
| 5,449,204 A | 9/1995 | Greene et al. | |
| 5,499,784 A * | 3/1996 | Crabere et al. | 244/135 A |
| 5,530,650 A | 6/1996 | Biferno et al. | |
| 5,539,624 A | 7/1996 | Dougherty | |
| 5,573,206 A | 11/1996 | Ward | |
| 5,785,276 A | 7/1998 | Ruzicka | |
| 5,810,292 A | 9/1998 | Garcia, Jr. et al. | |
| 5,904,729 A | 5/1999 | Ruzicka | |
| 5,906,336 A | 5/1999 | Eckstein | |
| 5,921,294 A | 7/1999 | Greenhalgh et al. | |
| 5,996,939 A | 12/1999 | Higgs et al. | |
| 6,044,242 A | 3/2000 | Kakiwaki et al. | |
| 6,076,555 A | 6/2000 | Hettinger et al. | |
| 6,119,981 A | 9/2000 | Young et al. | |
| 6,145,788 A | 11/2000 | Mouskis et al. | |
| 6,302,448 B1 | 10/2001 | Van Der Meer et al. | |
| 6,305,336 B1 | 10/2001 | Hara et al. | |
| 6,324,295 B1 | 11/2001 | Valery et al. | |
| 6,326,873 B1 | 12/2001 | Faria et al. | |
| 6,375,123 B1 | 4/2002 | Greenhalgh et al. | |
| 6,408,429 B1 * | 6/2002 | Marrion et al. | 717/100 |
| 6,428,054 B1 | 8/2002 | Zappa et al. | |
| 6,454,212 B1 | 9/2002 | Bartov | |
| 6,464,173 B1 | 10/2002 | Bandak | |
| 6,467,725 B1 | 10/2002 | Coles et al. | |
| 6,588,465 B1 | 7/2003 | Kirkland et al. | |
| 6,598,830 B1 | 7/2003 | Ambrose et al. | |
| 6,601,800 B2 | 8/2003 | Ollar | |
| 6,604,711 B1 | 8/2003 | Sinha et al. | |
| 6,651,933 B1 | 11/2003 | von Thal et al. | |
| 6,655,136 B2 | 12/2003 | Holt et al. | |
| 6,658,329 B1 * | 12/2003 | Howard et al. | 701/13 |
| 6,669,145 B1 | 12/2003 | Green | |
| 6,676,379 B2 | 1/2004 | Eccles et al. | |
| 6,752,357 B2 | 6/2004 | Thal et al. | |
| 6,779,758 B2 | 8/2004 | Vu et al. | |
| 6,796,527 B1 | 9/2004 | Munoz et al. | |
| 6,819,982 B2 | 11/2004 | Doane | |
| 6,824,105 B2 | 11/2004 | Edwards et al. | |
| 6,832,743 B2 | 12/2004 | Schneider et al. | |
| 6,837,462 B2 | 1/2005 | von Thal et al. | |
| 6,848,720 B2 | 2/2005 | Carns et al. | |
| 7,108,015 B2 | 9/2006 | Lombari et al. | |
| 2003/0038214 A1 | 2/2003 | Bartov | |
| 2003/0097658 A1 | 5/2003 | Richards | |
| 2003/0115863 A1 | 6/2003 | Holt et al. | |
| 2003/0136874 A1 | 7/2003 | Gjerdrum | |
| 2003/0218097 A1 | 11/2003 | Vu et al. | |
| 2004/0129865 A1 | 7/2004 | Doane | |
| 2004/0195909 A1 | 10/2004 | Hamzeh et al. | |
| 2005/0055143 A1 | 3/2005 | Doane | |
| 2006/0000949 A1 | 1/2006 | Schroeder | |
| 2006/0011782 A1 | 1/2006 | Schroeder | |
| 2006/0038076 A1 | 2/2006 | Schroeder | |
| 2006/0071475 A1 | 4/2006 | James | |
| 2006/0278759 A1 | 12/2006 | Carns | |
| 2006/0278763 A1 | 12/2006 | Carns et al. | |
| 2006/0284018 A1 | 12/2006 | Carns | |
| 2007/0069071 A1 | 3/2007 | Near et al. | |

FOREIGN PATENT DOCUMENTS

| | | | |
|---|---|---|---|
| DE | 29901583 | | 5/1999 |
| DE | 10013751 | | 10/2001 |
| EP | 0236584 | | 9/1987 |
| EP | 0780292 | | 6/1997 |
| EP | 0807577 | | 11/1997 |
| EP | 1094001 | | 4/2001 |
| EP | 1361156 | | 11/2003 |
| EP | 1447605 | | 8/2004 |
| EP | 1695911 | | 8/2006 |
| GB | 555984 | | 9/1943 |
| GB | 2237251 | * | 5/1991 |
| GB | 2257458 | | 1/1993 |
| GB | 2373488 | | 9/2002 |
| GB | 2 405 384 | | 3/2005 |
| IL | 128261 | | 5/2003 |
| RU | 2111154 | | 5/1998 |
| RU | 2140381 | | 10/1999 |
| RU | 2142897 | | 12/1999 |
| SU | 673798 | | 7/1979 |
| SU | 953345 | | 8/1982 |
| TW | 386966 | | 4/2000 |
| WO | WO-85/02003 | | 5/1985 |
| WO | WO-91/06471 | | 5/1991 |
| WO | WO-97/33792 | | 9/1997 |
| WO | WO-98/07623 | | 2/1998 |
| WO | WO-98/39208 | | 9/1998 |
| WO | WO-98/54053 | | 12/1998 |
| WO | WO-02/24529 | | 3/2002 |
| WO | WO-02/055385 | | 7/2002 |
| WO | WO-02/76826 | | 10/2002 |
| WO | WO-03/102509 | | 12/2003 |

OTHER PUBLICATIONS

Keller, George R., "Hydraulic System Analysis", pp. 40-41, 1985, Hydraulics & Pheumatics, Cleveland, Ohio.
U.S. Appl. No. 11/067,331, filed Feb. 25, 2005, Crangle.
U.S. Appl. No. 11/078,210, filed Mar. 11, 2005, Smith.
U.S. Appl. No. 11/157,245, filed Jun. 20, 2005, Takacs et al.
U.S. Appl. No. 11/217,696, filed Sep. 1, 2005, Schuster et al.
U.S. Appl. No. 11/258,819, filed Oct. 26, 2005, Cutler et al.

Flug Revue, "Airbus (Air Tanker) A330-200 Tanker," Jan. 26, 2004; www.flug-revue.rotor.com/FRTypen/FRA3302T.htm; Motorp-Presse Stuttgart, Bonn, German (5 pgs).

Thales Avionics Ltd., "Air Tanker Bids for Future Strategic Tanker Aircraft," Jul. 3, 2001; www.thalesavionics.net/press/pr43.html; (3 pgs).

Wikipedia, the free encyclopedia, "Electroactive Polymers," http://en.wikipedia.org/wiki/Electroactive_polymers, last update Feb. 27, 2005 (2 pages).

IFFC/Firefly III F-15; http://home.att.net/jbaugher1/fl_17.html; accessed Jul. 17, 2008; Mar. 4, 2000; 1 pg.

Kopp, Carlo, "Integrated Flight and Fire Control", Sep. 1982; Australian Aviation; p. 66-68.

Cord, Thomas J., "IFFC Flying Qualities Simulation", (date unknown); Air Force Wright Aeronautical Laboratories, Wright-Patterson Air Force Base, Ohio; pp. 296-300.

\* cited by examiner

SYSTEMS AND METHODS FOR AUTOMATICALLY AND SEMIAUTOMATICALLY CONTROLLING AIRCRAFT REFUELING

TECHNICAL FIELD

The present invention is directed generally toward systems and methods for automatically and semiautomatically refueling aircraft, including systems and methods that incorporate operator input and sensor input when coupling receiver aircraft to refueling devices.

BACKGROUND

In-flight refueling (or air-to-air refueling) is an important method for extending the range of aircraft traveling long distances over areas having no feasible landing or refueling points. Although in-flight refueling is a relatively common operation, especially for military aircraft, the aircraft to be refueled (e.g., the receiver aircraft) must be precisely positioned relative to the tanker aircraft in order to provide safe engagement while the fuel is dispensed to the receiver aircraft. The requirement for precise relative spatial positioning of the two rapidly moving aircraft makes in-flight refueling a challenging operation.

There are currently two primary systems for in-flight refueling. One is a hose and drogue system, which includes a refueling hose having a drogue disposed at one end. The hose and drogue are trailed behind the tanker aircraft once the tanker aircraft is on station. The pilot of the receiver aircraft then flies the receiver aircraft to intercept and couple with the drogue for refueling. Another existing system is a boom refueling system. The boom refueling system typically includes a rigid boom extending from the tanker aircraft, with a probe and nozzle at its distal end. The boom also includes airfoils controlled by a boom operator stationed on the refueling aircraft. The airfoils allow the boom operator to actively maneuver the boom with respect to the receiver aircraft, which flies in a fixed refueling position below and aft of the tanker aircraft.

One approach to addressing the challenge associated with precisely positioning the tanker aircraft relative to the receiver aircraft is to automate the process. For example, one existing arrangement includes using cameras housed in the tanker aircraft to determine the distance between the receiver aircraft and the tip of a refueling boom carried by the tanker aircraft. The system can then be used to automatically control the position of the boom to mate with a corresponding refueling receptacle of the receiver aircraft. The system can be configured to allow the boom operator to take control of the movement of the boom, for example, if the automatic system malfunctions or if for any reason the refueling boom must be directed away from the receiver aircraft. While generally effective, this approach may not provide the optimum level of controllability in all refueling situations.

SUMMARY

The following summary is provided for the benefit of the reader only, and does not limit the invention as set forth by the claims. The invention is directed generally toward systems and methods for automatically and/or semiautomatically refueling aircraft. A system in accordance with one aspect of the invention includes an operator input device configured to receive operator inputs and direct a first input signal corresponding to a target position for an aerial refueling device. The system can further include a sensor positioned to detect a location of at least one of the aerial refueling device and a receiver aircraft. The sensor can be configured to direct a second input signal corresponding to a location of at least one of the aerial refueling device and the receiver aircraft. The system can still further include a controller operatively coupled to the operator input device and the sensor to receive the first and second input signals. The controller can be configured to direct a command signal to adjust the position of the aerial refueling device in response to both the first and second input signals, unless either or both of the first and second input signals are absent or below a threshold value.

In particular aspects of the invention, the controller is configured to sum signals based at least in part on the first and second signals and direct the command signal based on the sum. In further particular aspects, the controller can be configured to sum portions of the first and second signals corresponding to motion along a first axis independently of portions of the first and second signals corresponding to motion along a second (e.g., orthogonal) axis.

A method in accordance with another aspect of the invention is directed to refueling an aircraft in flight. The method can include receiving a first signal from an operator input device, with the first signal corresponding to a target position for an aerial refueling device. The method can further include receiving a second input signal from a sensor, with the second input signal corresponding to the position of at least one of the aerial refueling device and a receiver aircraft. The method can still further include directing a change in the position of the aerial refueling device based on both the first and second input signals, unless at least one of the first and second input signals is absent or below a threshold value.

Still another aspect of the invention is directed to an unmanned aerial refueling system. The system can include an unmanned aircraft carrying a refueling device, and a controller configured to automatically control a position of the refueling device relative to a receiver aircraft. The system can still further include an electronic facility that is configured to be projected from the unmanned aircraft, e.g., for surveillance and/or electronic jamming. Accordingly, the system can serve as an unmanned strike support aircraft with a refueling capability.

DETAILED DESCRIPTION

Existing automated aerial refueling systems provide several advantages over a purely manual boom positioning arrangement. However, these systems may not be ideal in all situations. For example, these systems are typically configured to operate in one of two mutually exclusive modes: a first mode in which positioning the boom is completely automated, or a second mode in which positioning the boom is completely manual. However, these systems are unable to handle a situation in which the boom operator may wish to assist, but not take over, control of the boom.

The present disclosure describes systems for automatically refueling aircraft, including systems that receive inputs from both sensors and a human operator. Certain specific details are set forth in the following description and in FIGS. 1-7C to provide a thorough understanding of various embodiments of the invention. Well-known structures, systems and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

Many embodiments of the invention described below may take the form of computer-executable instructions, including routines executed by a programmable computer. Those skilled in the relevant art will appreciate that the invention can be practiced on computer systems other than those shown and described below. The invention can be embodied in a special-purpose computer or data processor that is specifically programmed, configured or constructed to perform one or more of the computer-executable instructions described below. Accordingly, the term "computer" as generally used herein refers to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The information can also be practiced in distributed environments, where tasks or modules are performed by remote processing devices that are linked through a communications network. In a distributed computing environment, program modules or subroutines may be located in local and remote memory storage devices. Aspects of the invention described below may be stored or distributed on computer-readable media, including magnetic or optically readable or removable computer disks, as well as distributed electronically over networks. Data structures and transmissions of data particular to aspects of the invention are also encompassed within the scope of the invention.

Figure 1:
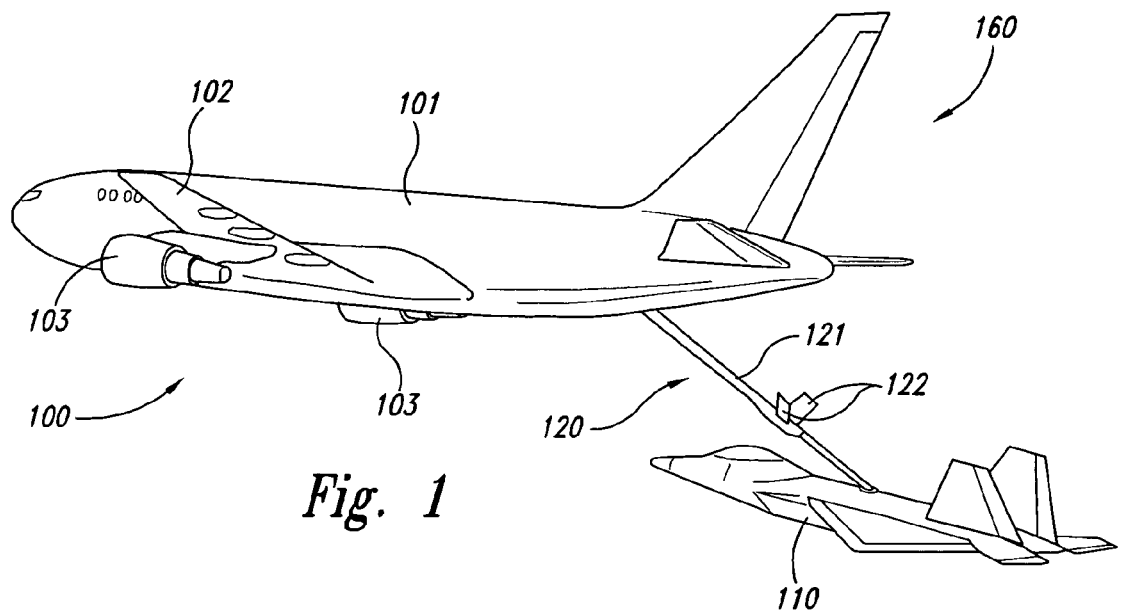
FIG. 1 is a partially schematic, isometric illustration of a tanker aircraft refueling a receiver aircraft in accordance with an embodiment of the invention.

FIG. 1 illustrates a system 160 that includes a tanker aircraft 100 in the process of refueling a receiver aircraft 110 with an aerial refueling device 120 configured in accordance with an embodiment of the invention. The tanker aircraft 100 has a fuselage 101, wings 102, and one or more engines 103 (two are shown in FIG. 1 as being carried by the wings 102). In other embodiments, the aircraft 100 can have other configurations. In a particular aspect of the embodiment shown in FIG. 1, the aerial refueling device 120 can include a refueling boom 121 having actuatable control surfaces 122. The positions of the control surfaces 122 can be adjusted to "fly" the boom 121 into engagement with the receiver aircraft 110. The position of the boom 121 can be controlled based on inputs received automatically via a sensor, as well as inputs received from a human operator. Accordingly, this arrangement can allow the operator to control the boom 121 during selected periods of time, and can allow the system 110 to automatically control the boom 121 at other times, without requiring the operator to direct the system 160 to switch back and forth between autonomous and manual control. Furthermore, the operator can control the location of the boom 121 with assistance from the automatic portion of the system 160, while allowing the operator the opportunity to override the automatic portion of the system 160 at any point. Further aspects of the manner in which the system 160 operates are described below.

Figure 2:
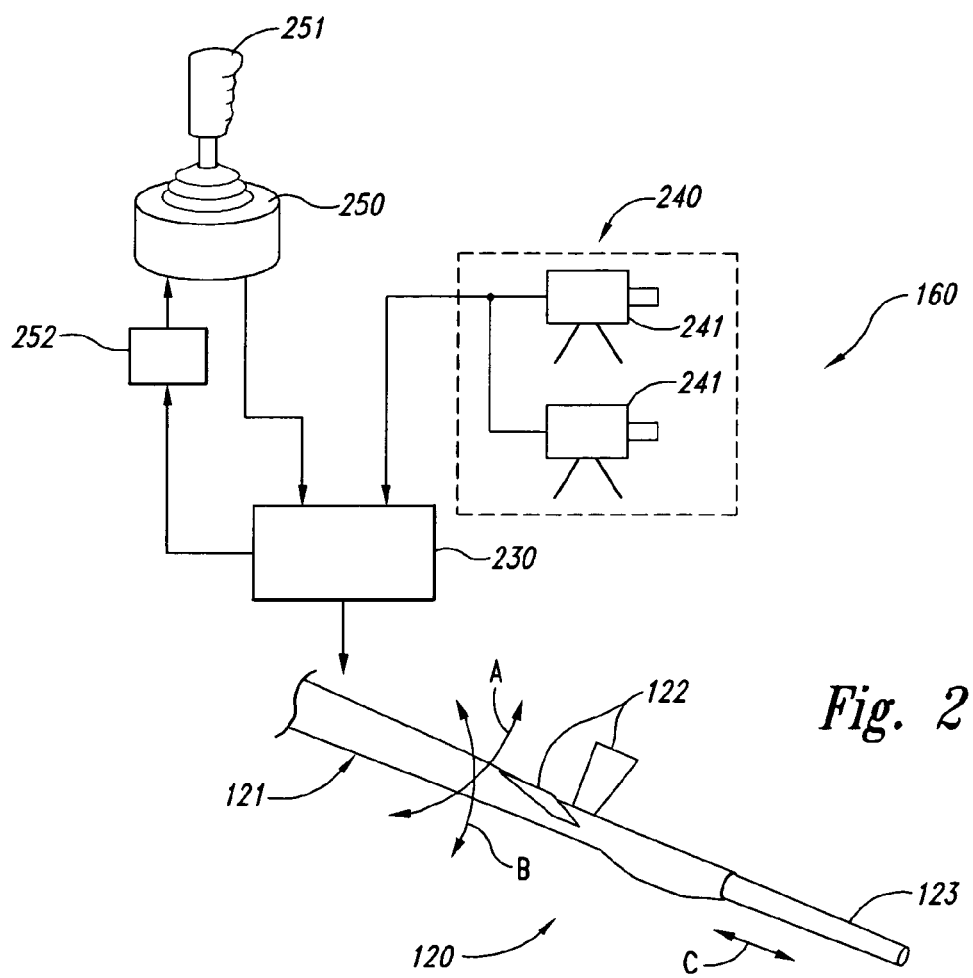
FIG. 2 is a partially schematic illustration of a system for controlling an aerial refueling device in accordance with an embodiment of the invention.

FIG. 2 schematically illustrates components of the system 160 initially described above with reference to FIG. 1. The system 160 can include a controller 230 that controls the motion of the aerial refueling device 120, based on inputs received from an operator input device 250 and a sensor 240. The operator input device 250 can include a joystick 251 or other suitable manual input control device (e.g., a yoke). The sensor 240 can include an optical sensor, for example, a pair of cameras or other photosensitive detectors 241 that provide a stereoscopic image to the controller 230. The controller 230 can combine the input signals (in a manner described in greater detail below with reference to FIG. 6) and, based upon the combination of the signals, direct a command signal to the aerial refueling device 120 to change a position of the device.

In one embodiment, the aerial refueling device 120 can include the boom 121. Accordingly, the controller 230 can direct actuation of the control surfaces 122 to provide for lateral motion of the boom 121 (as indicated by arrow A) and vertical or pitch motion of the boom 121 (as indicated by arrow B). The controller 230 can also control axial actuation of a deployable boom tip 123, as indicated by arrow C.

In a particular aspect of this embodiment, the controller 230 can be coupled to an actuator 252 that is in turn coupled to the operator input device 250 to provide feedback to the operator. Accordingly, when the controller 230 directs a command signal to move the boom 121 in a particular manner, a corresponding command signal can be directed to the actuator 252 to move the operator input device 250 in a corresponding manner. As a result, an operator placing a hand very lightly on the joystick 251 will feel the joystick 251 move in a manner that tracks the motion of the boom 121, and in a manner that is commanded by the controller 230 based upon the sensor 240. If the operator places any force (e.g., greater than a threshold level of force) on the joystick 251, the operator's input can also influence the position of the boom 121. In a particular aspect of this embodiment, the rate at which the controller 230 will direct a motion of the boom 121 based on the operator's input, will vary proportionately to the force applied by the operator to the operator input device 250. Suitable operator input devices 250 for performing this function are available from MPC Products Corporation of Skokie, Ill.

Figure 3:
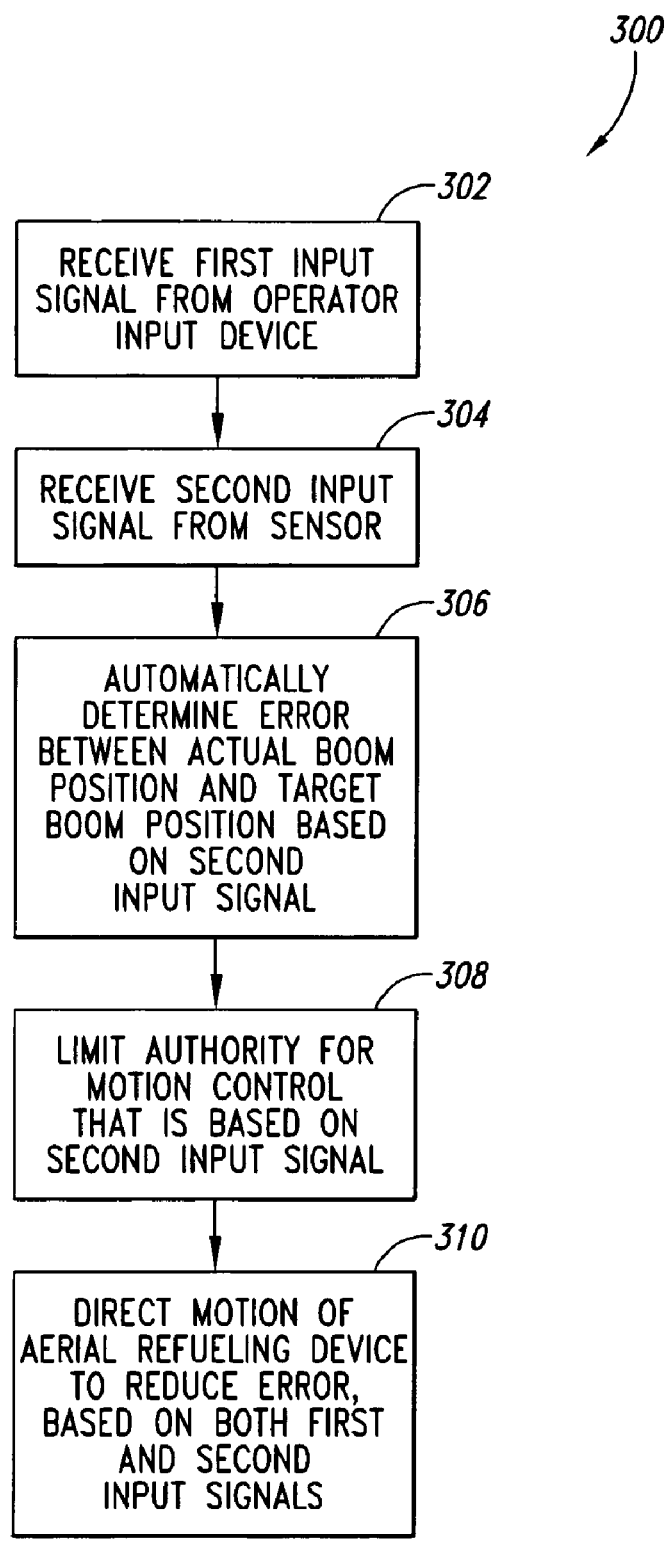
FIG. 3 is a flow diagram illustrating a method for controlling motion of an aerial refueling device in accordance with an embodiment of the invention.

FIG. 3 is a flow diagram illustrating a process 300 for directing the motion of a boom or other aerial refueling device. In process portion 302, the process 300 includes receiving a first input signal from an operator input device, and in process portion 304, the process includes receiving a second input signal from a sensor. The first input signal can correspond to a target position for the aerial refueling device, and the second signal can correspond to an actual position of the refueling device and/or the receiver aircraft. As used herein in this context, the term "position" can refer to an absolute position or a relative position. For example, position can refer to an absolute position (e.g., based on GPS data or other data) of the boom and/or receiver aircraft. In another example, position can refer to a position of the boom and/or the receiver aircraft relative to the tanker aircraft or relative to each other. In particular embodiments, position can refer to the separation distance between the boom and the receiver aircraft.

In process portion 306, the process 300 can include automatically determining an error between the actual boom position and a target boom position, based on the second input signal. The authority granted to the automatic motion control of the aerial refueling device can then be limited (process portion 308). Accordingly, process portion 308 can prevent the automatic portion of the system from overwhelming a large manual operator input. The process can then include directing the motion of the aerial refueling device to reduce the error, based on both the first and second signals (process portion 310).

In a particular embodiment, process portion 310 can include directing the motion of the aerial refueling device based on both the first and second signals, unless either or both input signals are absent or below a threshold value. For example, if the operator applies no force to the operator input device (or applies a very small force), then the system can direct the motion of the boom based entirely on the automatically determined position error value. Conversely, if the automatically determined position error value is zero (e.g., the aerial refueling device is accurately positioned for refueling), but the operator applies a force to the operator input device, the system will allow the operator to override the automatically determined position error value. The system can continuously monitor both the first and second signals so as to seamlessly transition between fully automated motion, fully manual motion and motion based on both manual and automated inputs.

Figure 4:
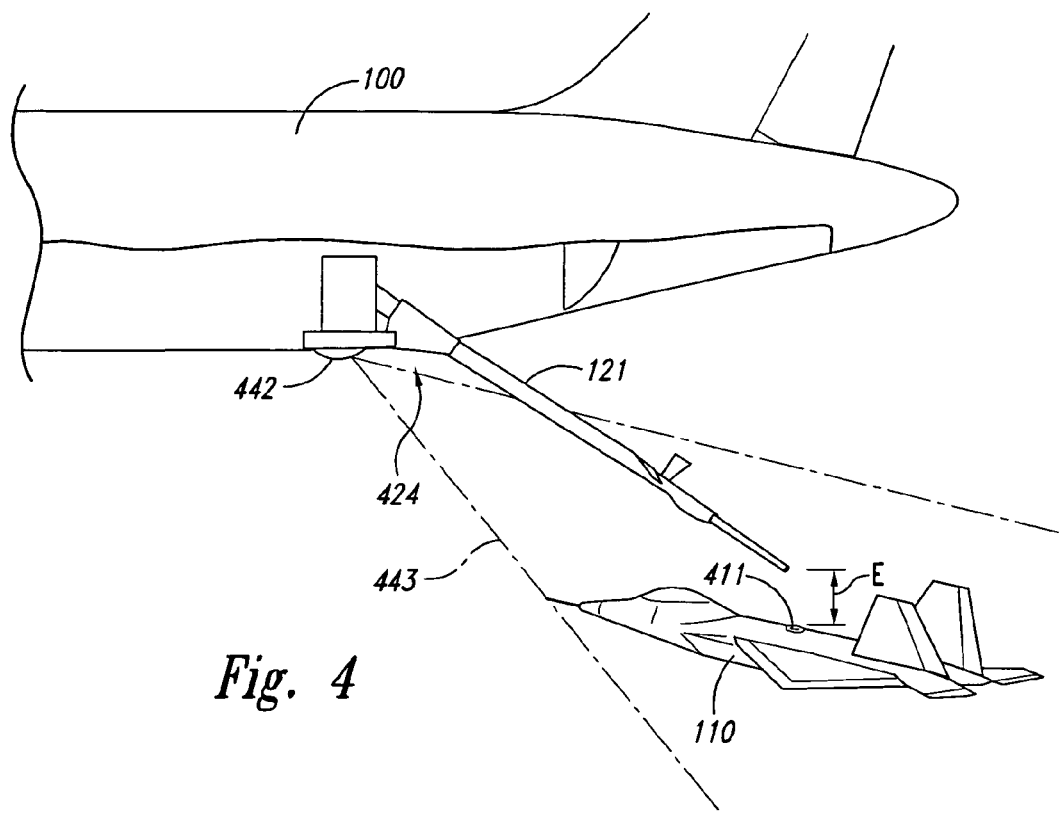
FIG. 4 is a partially schematic, side elevation view of a tanker aircraft refueling a receiver aircraft in accordance with an embodiment of the invention.

FIG. 4 illustrates a partially schematic, partially cut away side view of the tanker aircraft 100 refueling the receiver aircraft 110 in accordance with an embodiment of the invention. In one aspect of this embodiment, a sensor pod 442 houses the sensor 240 (FIG. 2) at a location where the sensor 240 can detect the positions of the boom 121 and the receiver aircraft 110. Accordingly, the sensor or sensors 240 located within the sensor pod 442 can have a sensor field of view 443 that extends downwardly and aft from the sensor pod 442. The sensors within the sensor pod 442 can be configured to detect a position of at least one of the receiver aircraft 110 and the boom 121 so as to determine a position error E. For example, the position error E can be the vector distance between the tip of the boom 121 and a refueling receptacle 411 of the aircraft and can accordingly have components in multiple coordinate directions (e.g., azimuth and elevation).

Figure 5:
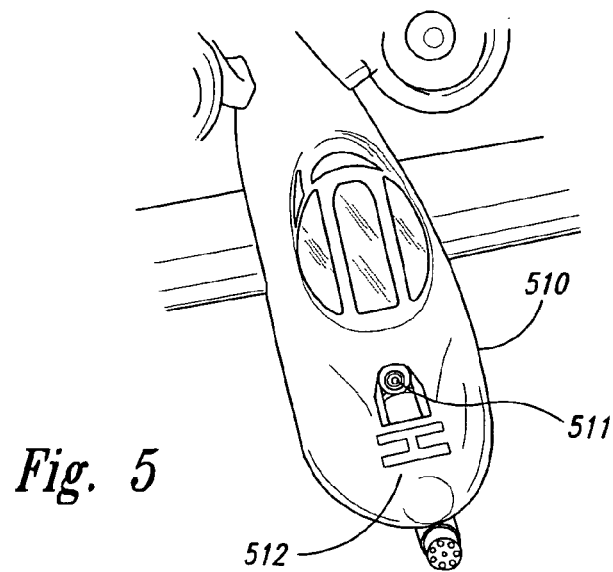
FIG. 5 is a partially schematic, top isometric view of a representative receiver aircraft.

FIG. 5 illustrates a receiver aircraft 510 having a configuration different than that of the aircraft 110 shown in FIG. 4, and illustrates one suitable position for a fuel receptacle 511. The fuel receptacle 511 can have a distinctive visual appearance and/or can include visual cue markings 512 that assist the sensor(s) in precisely identifying the location of the fuel receptacle 511. In one embodiment, a single sensor or pair of sensors can be used to optically determine the distance between the boom tip and the receptacle. In another embodiment, the boom (not visible in FIG. 5) can have a separate position sensor associated with it (e.g., an accelerometer and associated processor) and the position detected by the boom position sensor can be combined with the visual image of the fuel receptacle 511 to determine the distance between the boom tip and the fuel receptacle 511. Suitable systems and methods for making the position error determinations are disclosed in U.S. Pat. No. 6,752,357 and U.S. Pat. No. 5,530,650, both incorporated herein in their entireties by reference.

Figure 6:
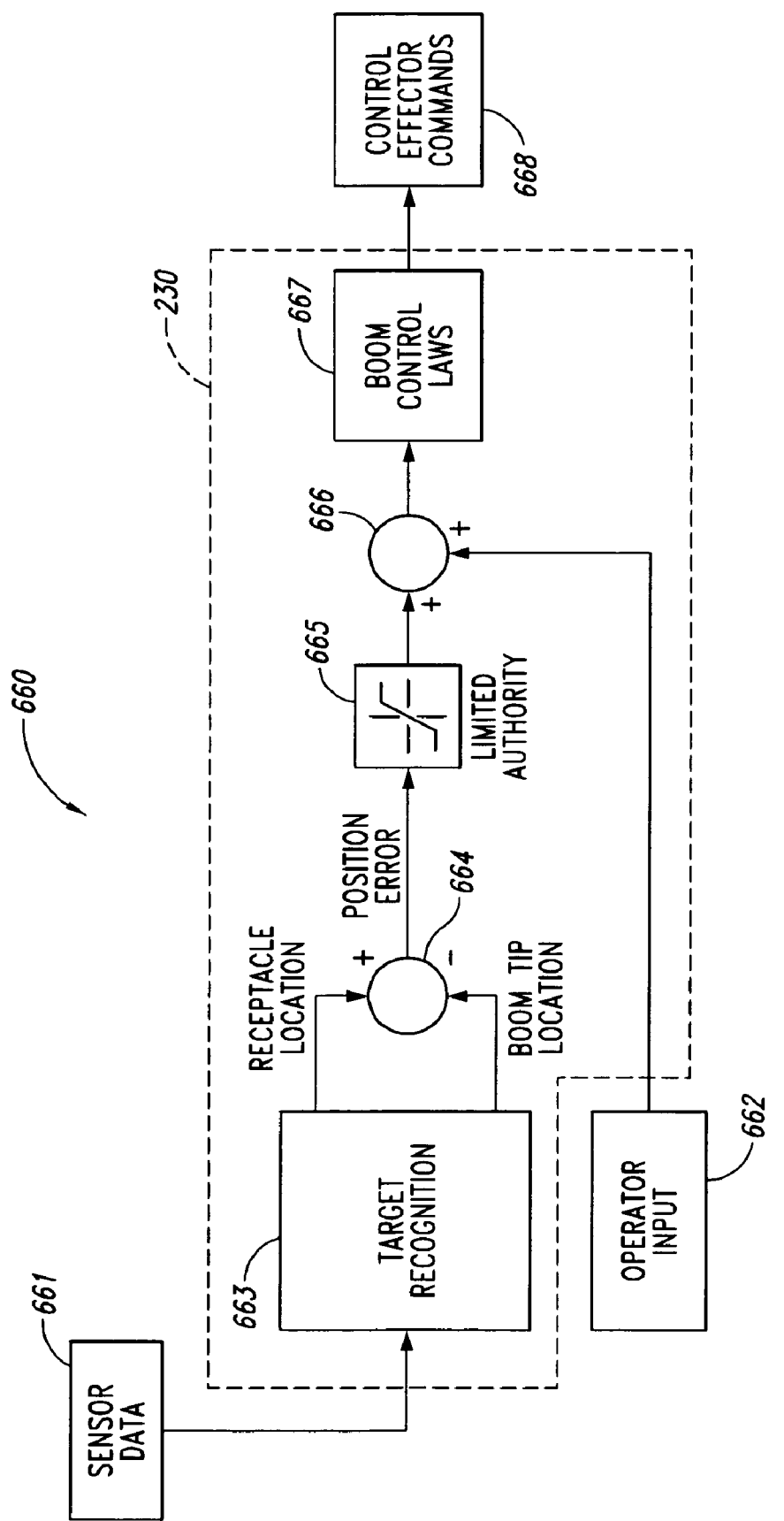
FIG. 6 is a schematic illustration of a system configured to receive sensor data and operator input for controlling a refueling boom in accordance with an embodiment of the invention.

FIG. 6 is a schematic illustration of a system 660 configured to carry out tasks described above with reference to FIGS. 1-5. In one aspect of this embodiment, many of the functions described in connection with the system 660 can be carried out by the controller 230 described above with reference to FIG. 2. For example, the controller 230 can include a target recognition component 663 that receives sensor data 661. The target recognition component 663 can be configured to determine the location of the receiver aircraft receptacle and the tip of the refueling boom. A summing component 664 can determine a position error based on the difference between the receptacle location and the boom tip location. A limiter 665 can limit the position error signal that is based on the sensor data 661. The limiter 665 can accordingly be used to ensure that operator inputs beyond the limiter value will be sufficient to override inputs based on the sensor data 661. This arrangement can also allow the operator to manually make gross movements of the boom, while allowing automated portions of the system (e.g., based on the sensor data 661) to fine-tune the location of the boom. The automatically determined position error signal is then summed with the operator input 662 by another summing component 666, and the resultant error signal is then acted upon by a series of boom control laws 667. The output of the boom control laws 667 is one or more control effector commands 668 that direct the boom to a target location (e.g., the receptacle of the receiver aircraft) via actuators and/or other devices.

One feature of several embodiments of the systems and methods described above with reference to FIGS. 1-6 is that they can include directing the position of an aerial refueling device (e.g., a deployable boom) based on automated sensor input, as well as input from a human operator. This is unlike some conventional systems, which operate in either an automatic mode or a manual mode, but are not configured to simultaneously act on both automated sensor input information and manual input information. An advantage of this arrangement is that the manual operator can remain in the control loop at all times without affecting the ability or the system to continue providing automatically determined inputs for the motion of the boom. The operator can easily alternate between being an active or passive participant in the control loop without taking any action other than simply touching or releasing (respectively) the manual input control device. As a result, the operator can easily direct the boom away from the receiver aircraft if such an action is necessary and, once it is again appropriate for the boom to be automatically positioned close to the receiver aircraft, the operator can simply release the operator input device and allow the boom to be automatically directed to the receiver aircraft refueling receptacle.

Another advantage of the foregoing feature is that it can allow the operator and the automated sensors to simultaneously control different aspects of the motion of the refueling device. For example, the operator may wish to automatically have the boom aligned laterally with the refueling receptacle, but have the tip of the boom above the receiver aircraft (e.g., to allow the pilot of the receiver aircraft greater flexibility in positioning his aircraft, or for other reasons). Accordingly, the boom operator can apply a pitch-directed force to the input device to control the pitch of the boom, while allowing the operator input device to move laterally, thereby allowing the automated portion of the system to direct the lateral motion of the boom. In other embodiments, the motion can be divided between the operator and the automated sensor in different manners. For example, the automated sensor can be used to control both the pitch and lateral position of the boom, and the operator can control the extension or retraction of the probe tip.

Still another advantage of features of several of the foregoing embodiments is that they can be used to gradually shift from a fully manual boom operation to a fully automated boom operation. For example, during system testing, pilot training, and/or boom operator training, the operator can remain in the control loop to position the boom for as long as it takes for the operator, the tanker aircraft pilot, and the receiver aircraft pilot to become comfortable with the automated motion of the boom. The operator can gradually reduce the input he or she provides as this comfort level increases, and can ultimately oversee a completely hands-off operation, while remaining available to intervene for an emergency breakaway procedure or other acute procedure.

Figure 7A:
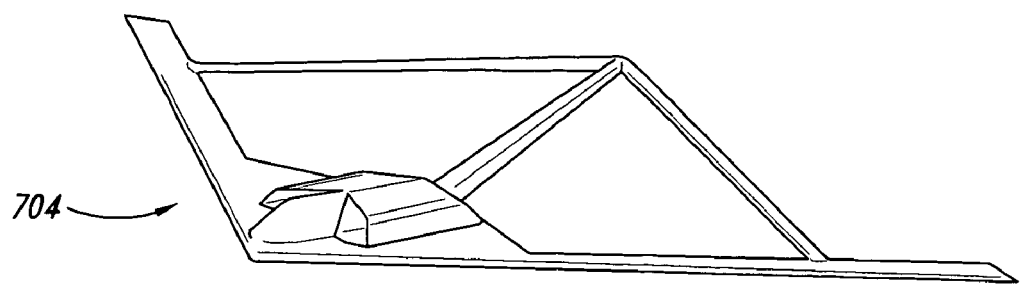
FIGS. 7A-7C illustrate autonomous, unmanned aerial refueling aircraft configured in accordance with further embodiments of the invention.
Figure 7B:
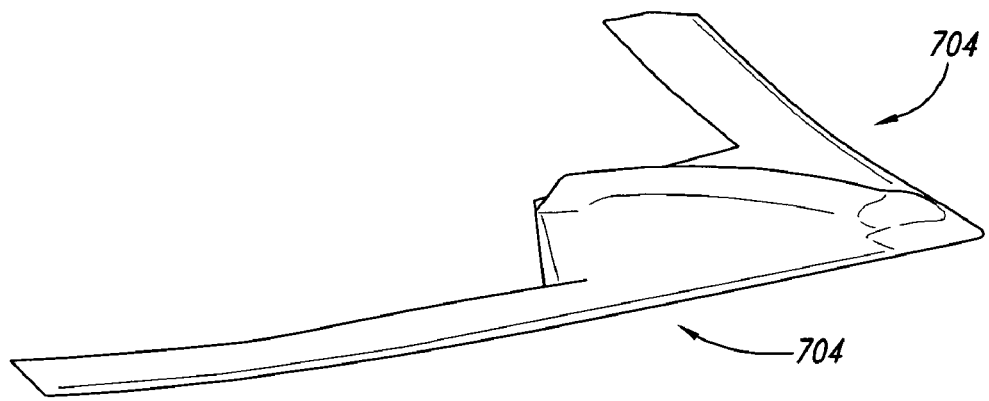
Figure 7C:
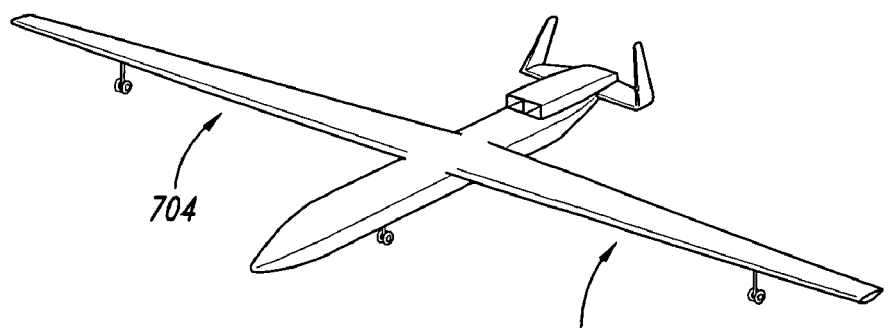

As described above, the foregoing system can, in some cases, be used in a fully automated manner to direct the motion of the aerial refueling device without any human intervention. Accordingly, this system can be installed on unmanned aerial refueling aircraft. Examples of such aircraft are illustrated in FIGS. 7A, 7B, and 7C. In a particular aspect of the embodiments shown in FIGS. 7A-7C, these unmanned aircraft can include not only an automatic refueling capability, but can also include other capabilities that make the aircraft suitable as unmanned strike support aircraft. Such capabilities can include antennae 704 integrated with the aircraft wings and used for air-to-ground surveillance, air-to-air surveillance, air traffic control (e.g., aircraft proximity) and/or other surveillance tasks. These aircraft can also use the additional electronic capability for other purposes, for example, to jam electronic signals from target aircraft or ground facilities. Because these capabilities are integrated with an unmanned aerial refueling tanker, the aircraft can perform surveillance tasks while being on station and available to refuel either manned aircraft or unmanned aircraft. This combination of capabilities can significantly increase the utility of the aircraft.

From the foregoing, it will be appreciated that specific embodiments of the invention have been described herein for purposes of illustration, but that various modifications may be made without deviating from the invention. For example, the signals transmitted by the sensor may include a visual indication of the receiver aircraft and/or the refueling system, or these signals can include other characteristics (e.g., the position of the boom relative to the tanker aircraft, based on input from displacement sensors). Aspects of the invention described in the context of particular embodiments may be combined or eliminated in other embodiments. For example, the refueling systems can be installed on aircraft having configurations other than those described above, and/or can be used to control aerial refueling devices other than those described above (e.g., hose and drogue devices). Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

I claim:

1. An aerial refueling system, comprising:
   an operator input device configured to receive operator inputs and direct a first input signal corresponding to a target position for an aerial refueling device;
   a sensor positioned to detect a location of a receiver aircraft, the sensor being configured to direct a second input signal corresponding to a location of the receiver aircraft; and
   a controller operatively coupled to the operator input device and the sensor to receive both the first and second input signals, the controller being configured to direct a command signal to adjust the position of the aerial refueling device in response to both the first and second input signals.

2. The system of claim 1 wherein the controller is configured to sum signals based at least in part on the first and second signals and direct the command signal based on the sum.

3. The system of claim 1 wherein the controller is configured to sum signals based at least in part on portions of the first and second signals and corresponding to motion along a first axis independently of signals based at least in part on portions of the first and second signals corresponding to motion along a second axis, wherein the second axis is generally orthogonal to the first axis.

4. The system of claim 1 wherein the controller includes a limiter configured to limit the effect of the second input signal when the second input signal corresponds to a target motion greater than a threshold amount.

5. The system of claim 1 wherein the controller is configured to continually receive input signals from both the operator input device and the sensor.

6. The system of claim 1 wherein the controller is configured to direct a command signal based only on the first input signal when the second input signal is absent or below a threshold value, and wherein the controller is configured to direct a command signal based only on the second input signal when the first input signal is absent or below a threshold value.

7. The system of claim 1 wherein at least one of the sensor and the controller is configured to detect a difference in position between the aerial refueling device and the receiver aircraft, and wherein the controller is configured to direct a command signal that moves the aerial refueling device in a direction that reduces the difference in position.

8. The system of claim 1, further comprising an actuator coupled to the controller and the operator input device, the actuator being configured to move the operator input device in a manner that is consistent with the command signal.

9. The system of claim 1 wherein the sensor includes a photosensitive sensor coupled to a target recognition device.

10. The system of claim 1, further comprising the aerial refueling device, and wherein the aerial refueling device includes a deployable boom.

11. The system of claim 1, further comprising:
    the aerial refueling device;
    a tanker aircraft carrying the aerial refueling device; and
    a receiver aircraft positioned proximate to the tanker aircraft.

12. The system of claim 11 wherein the receiver aircraft is an unmanned air vehicle.

13. The system of claim 1, further comprising:
    the aerial refueling device, and wherein the aerial refueling device includes a generally rigid boom that is movable between a stowed position and a deployed position; and
    a tanker aircraft carrying the boom, the controller, the operator input device, and the sensor;
    wherein the sensor includes a plurality of cameras coupled to a target recognition device, the target recognition device including a computer-readable medium containing instructions to recognize at least portions of the boom and a receiver aircraft.

14. The system of claim 1 wherein the controller includes a computer readable medium containing instructions to direct a change in position of the aerial refueling device.

15. An aerial refueling system, comprising:
   input means for receiving operator inputs and directing a first input signal corresponding to a target position for an aerial refueling device;
   sensor means for detecting a location of at least one of the aerial refueling device and a receiver aircraft and directing a second input signal; and
   control means for controlling a position of the aerial refueling device, the control means being operatively coupled to the input means and the sensor means to receive both the first and second input signals, the control means being configured to adjust the position of the aerial refueling device in response to both the first and second input signals.

16. The system of claim 15 wherein the control means is configured to direct a command signal based only on the first input signal when the second input signal is absent or below a threshold value, and wherein the control means is configured to direct a command signal based only on the second input signal when the first input signal is absent or below a threshold value.

17. An aerial refueling system, comprising:
   an operator input device configured to receive operator inputs and direct a first input signal corresponding to a target position for an aerial refueling device;
   a sensor positioned to detect a location of a receiver aircraft, the sensor being configured to direct a second input signal corresponding to a location of the receiver aircraft; and
   a controller operatively coupled to the operator input device and the sensor to receive the first and second input signals, the controller being configured to direct a command signal to adjust the position of the aerial refueling device in response to both the first and second input signals unless either or both of the first and second input signals are absent or below a threshold value, wherein the controller is configured to sum signals based at least in part on the first and second signals and direct the command signal based on the sum.

18. An aerial refueling system, comprising:
   an operator input device configured to receive operator inputs and direct a first input signal corresponding to a target position for an aerial refueling device;
   a sensor positioned to detect a location of a receiver aircraft, the sensor being configured to direct a second input signal corresponding to a location of the receiver aircraft; and
   a controller operatively coupled to the operator input device and the sensor to receive the first and second input signals, the controller being configured to direct a command signal to adjust the position of the aerial refueling device in response to both the first and second input signals unless either or both of the first and second input signals are absent or below a threshold value, wherein the controller includes a limiter configured to limit the effect of the second input signal when the second input signal corresponds to a target motion greater than a threshold amount.

* * * * *